United States Patent [19]

Ponticello

[11] 4,056,543
[45] Nov. 1, 1977

[54] PROCESS OF PREPARING SUBSTITUTED ACRYLATES

[75] Inventor: Ignazio Salvatore Ponticello, Rochester, N.Y.

[73] Assignee: Eastman Kodak Company, Rochester, N.Y.

[21] Appl. No.: 721,149

[22] Filed: Sept. 7, 1976

[51] Int. Cl.$^2$ .................... C07D 303/16; C07C 69/52
[52] U.S. Cl. .............................. 260/348.59; 560/118; 560/146; 560/193; 560/197; 560/201
[58] Field of Search ........... 260/485 R, 485 L, 468 G, 260/348 A, 485 N, 485 P, 485.7

[56] References Cited

U.S. PATENT DOCUMENTS

| 2,467,926 | 4/1949 | Ardis | 260/465.4 |
| 2,467,927 | 5/1947 | Ardis | 260/465.4 |
| 2,721,858 | 10/1955 | Joymer et al. | 260/67 |
| 3,178,379 | 4/1965 | Wicker et al. | 260/17 |
| 3,221,745 | 12/1965 | Coover et al. | 128/334 |
| 3,813,438 | 5/1974 | Oshima et al. | 260/468 G |

FOREIGN PATENT DOCUMENTS 1,197,467  7/1970  United Kingdom.

OTHER PUBLICATIONS

Feely et al., Organic Synthesis, 38, pp. 22–25, (1955).
Brocksom et al., J. Org. Chem. 39, No. 14, p. 2114–2116, (1974).

*Primary Examiner*—Jane S. Myers
*Attorney, Agent, or Firm*—Arthur H. Rosenstein

[57] ABSTRACT

Methylenemalonates are prepared by reacting a substituted norbornene with an electrophilic material in the presence of a lithium amide complex and pyrolyzing. The resulting acrylates are useful as fast setting, polymerizable adhesives.

7 Claims, No Drawings

PROCESS OF PREPARING SUBSTITUTED ACRYLATES

This invention relates to a novel process of preparing acrylate adhesive compositions. The adhesive compositions are rapid-setting and can be used for many purposes including surgical use.

There has been much work described in the prior art relating to adhesive compositions containing monomeric cyanoacrylates and methylenemalonates. These esters have been found to be outstandingly high-strength adhesives for bonding all kinds of materials, such as glass, metals, plastics and rubber to themselves or to other materials. The mechanism by which the cyanoacrylates and methylenemalonates function as adhesives is not completely understood but it is thought that the adhesive properties are attributed to the rapidity with which thin films of the monomers polymerize. When two surfaces are placed together with a thin film of a monomeric cyanoacrylate or methylenemalonate between them, the monomer rapidly polymerizes and forms an adhesive bond.

Various methods of preparing cyanoacrylates are described in the prior art. For example, U.S. Pat. No. 2,467,927 describes depolymerization of a polymer formed by reacting a cyanoacetate with formaldehyde in the presence of a condensation catalyst. U.S. Pat. No. 2,721,858 discloses reacting a cyanoacetate with formaldehyde in the presence of a condensation catalyst and in solution in an organic solvent and removing the solvent and water formed during the reaction simultaneously. In U.S. Pat. No. 3,178,379, a process for preparing cyanoacrylate adhesives is described which comprises blending a polymeric viscosity modifier with a monomeric cyanoacrylate and stripping the organic solvent. U.S. Pat. No. 3,221,745 describes a method of preparing monomeric dialkyl esters of methylenemalonic acid comprising hydrogenating the olefinic bond of a dialkyl alkoxy-methylenemalonate and pyrolyzing the reaction product. This patent describes the adhesive qualities of the methylene-malonates obtained and their use as surgical adhesives.

In accordance with the present invention, a method of preparing methylenemalonates comprises (1) reacting an endo- and exo-5-alkoxycarbonyl-substituted-2-norbornene with an electrophilic material in the presence of an alkyl-substituted lithium amide complex at a temperature range of −78° to −40° C and (2) pyrolyzing the resulting norbornene at a temperature of 400° to 800° C at a pressure of 1mm to 760mm Hg in an inert atmosphere.

In a further embodiment of this invention, compounds having the formula

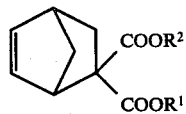

wherein $R^2$ is alkyl preferably containing from about 1 to about 10 carbon atoms such as methyl, ethyl, propyl, butyl, hexyl, and the like or $R^1$; and $R^1$ is selected from the group consisting of alkyl preferably containing from about 1 to about 10 carbon atoms such as methyl, ethyl, propyl, butyl, hexyl, and the like, allyl, $R^5O(CH_2)_n$, glycidyl, chloroalkyl such as chloroethyl, vinyl, propargyl, cycloalkyl, preferably containing from 5 to 7 carbon atoms such as cyclopentyl, cyclohexyl, cycloheptyl and the like, $R^5$ is alkyl preferably containing from 1 to 10 carbon atoms such as described above and $n$ is an integer from 1 to 10, can be cleaved by pyrolyzing to form the adhesive monomers which upon being subjected to a slight amount of moisture polymerize to form an adhesive bond between two objects.

The process, according to the invention, comprises reacting and endo- and exo-5-alkoxycarbonyl-substituted-2-norbornene with an electrophilic material in the presence of an alkyl-substituted lithium amide complex and subsequently pyrolyzing.

The endo- and exo-5-alkoxycarbonyl-substituted-2-norbornene can be prepared from the well-known Diels-Alder reaction by mixing a dienophile and cyclopentadiene at room temperature or, if desired, with heating or use of Lewis catalysts such as boron trifluoride etherate, aluminum chloride, zinc chloride and the like. The reaction and the conditions under which it can be carried out are described in British Pat. No. 1,364,352. The reaction can generally be depicted as follows:

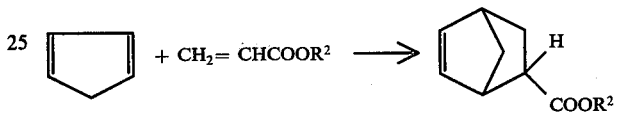

wherein $R_2$ is as described above.

It will be apparent to one skilled in the art that throughout the specification and claims alkyl and aryl groups can be substituted with a variety of substituents such as halogen, cyanoalkyl and the like.

The endo- and exo-5-alkoxycarbonyl-substituted-2-norbornene preferably having the formula:

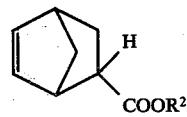

as described above is reacted with an electrophilic material. The electrophilic materials operable in the process are generally described in *Journal of Organic Chemistry*, "Ester Enolates a New Preparation of Malonates, Phosphoroacetates and α-Selenyl and Sulfinyl Esters" by Brocksom, Petragnani and Rodriques, Vol. 39, No. 14, 1974, pp 2114–2116 which is herein incorporated by reference.

The preferred electophilic material is a compound having the formula $XCOOR^1$ wherein $R^1$ is as described on page 3, lines 17 to 22 and X is halogen such as chloride, iodide or bromide.

Examples of preferred electrophilic materials include alkyl haloformates such as methyl chloroformate, ethyl chloroformate and butyl chloroformate, allyl chloroformate and others such as phenyl chloroformate and the like.

The molar ratio of electrophilic material to norbornene can be varied widely, for example, from about 2:1 to 1:2 but in the preferred embodiment the reactants are present in equal molar amounts.

The electrophilic material and substituted norbornene are reactive in the presence of an alkyl-substituted lithium amide complex. The lithium amide complexes can be prepared as described in the *Journal of the American*

Chemical Society "The Reaction of Lithium N-Isopropylcyclohexylamide with Esters; a Method for the Formation and Alkylation of Ester Enolates"by Rathke and Lindert, vol. 93, No. 9, pages 2,318 to 2,320, 1971. Generally the lithium amide complex is prepared by reacting equal molar amounts of alkyl lithium such an n-butyl lithium with any sterically hindered secondary amine such as N-iso-propylcyclohexylamine, diisopropylamine, dicyclohexylamine and the like in the presence of a solvent such as tetrahydrofuran at temperatures of from about 0° C to about 10° C.

The reaction generally can be structured as follows:

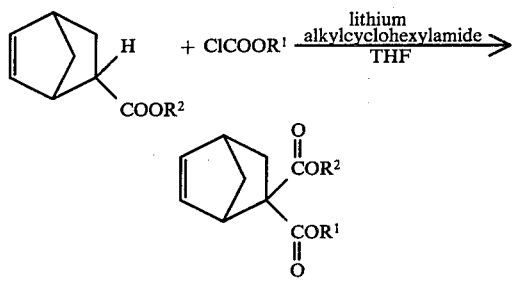

wherein $R^2$ and $R^1$ are as described above.

Examples of useful alkyl-substituted lithium amide complexes include lithium alkylcyclohexylamide wherein the alkyl contains from 1 to 12 carbon atoms, lithium N,N-diisopropylamide and lithium dicyclohexylamide and the like.

The lithium amide complex is generally present in an equimolar amount to the reactants.

The reactants and the lithium amide complex can be mixed simultaneously but in the preferred embodiment the norbornene is added to the lithium amide complex and the electrophilic material is added subsequently. The reaction can be carried out in a solvent such as tetrahydrofuran, glyme, diglyme or the like.

The reaction is carried out at a temperature range of from about −78° to about −40° C. Although the reaction can be run at any pressure, it is generally preferred to react the materials at approximately atmospheric pressure.

On completion of the reaction it may be desirable to isolate the resulting endo- and exo-5,5-disubstituted-2-norbornene by, for example, pouring the product over cracked ice containing hydrochloric acid, separating the organic layer and extracting with ether and purifying by distillation.

The disubstituted norbornene is then pyrolyzed by heating for example, by passage through a hot quartz tube packed with quartz chips at elevated temperatures of from about 40° C to about 800° C at about 1 millimeter to about 760 millimeters Hg pressure in an inert atmosphere. The pyrolyzing process is a well-known cleaving process generally referred to as Retro Diels-Alder reaction. This general reaction is more specifically detailed in British Pat. No. 1,364,352.

While the pressure used in the Retro Diels-Alder reaction can vary widely, it should be pointed out that if atmospheric or near atmospheric pressure is used, an inert gaseous atmosphere such as nitrogen gas should be the environment in which the reaction is carried out.

The reaction can be shown as follows:

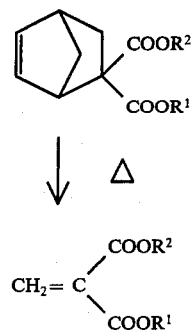

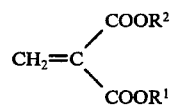

wherein $R^1$ and $R^2$ are as previously defined.

If desired, the resulting product after pyrolysis can be purified, preferably by distillation.

The resulting monomeric compound has the formula:

$$CH_2=C\begin{matrix}COOR^2\\COOR^1\end{matrix}$$

wherein $R^1$ and $R^2$ are as described above.

Preferred methylenemalonates of this invention include methyl ethoxyethyl methylenemalonate, methyl methoxyethyl methylenemalonate, methyl allyl methylenemalonate, methyl vinyl methylenemalonate, methyl chlorethyl methylenemalonate, methyl glycidyl methylenemalonate and the like. Mixtures of these methylenemalonates can also be desirable.

Addenda can also be added to the adhesive composition such as viscosity regulating polymers as described in U.S. Pat. No. 3,178,379 and stabilizers such as hydroquinone, monomethyl ether of hydroquinone, sulfur dioxide and the like such as those described in U.s. Pat. No. 3,557,185 as well as other common addenda for such materials.

The adhesives prepared are useful as adhesives to adhere plastic to plastic, metal to metal, glass to glass and the same materials to other materials and the like and find utility as surgical adhesives, for instance in hemostasis or anastamosis and in the repair and regrowth of living tissue.

The adhesives need merely be spread in a thin film on the surface to be bonded. Polymerization occurs within a few seconds, generally due to a slight amount of moisture on the substrate.

The invention is further illustrated by the following examples.

Preparation I

Endo- and Exo-5-carboethoxy-5-carbomethoxy-2-norbornene

To a solution of N-isopropylcyclohexylamine (141 g, 1 mole) in tetrahydrofuran (1 l.) at 0° C was added n-butyl-lithium (1 mole) in hexane. Then endo- and exo-5-carbomethoxy-2-norbornene (152 g, 1 mole) was added dropwise at −78° C and the solution of the anion was stirred at −78° C for an additional 15 minutes. Finally ethyl chloroformate (108.5 g, 1 mole) was added dropwise at −78° C and the reaction mixture was stirred at this temperature for 30 minutes. The mixture was poured onto cracked ice containing hydrochloric acid (125 ml). The organic layer was separated and the aqueous layer was extracted with 4 200 ml portions of diethyl ether. The combined organic extracts were washed with saturated bicarbonate solution (250 ml), dried, filtered and the solvent removed. The residue was distilled giving a colorless liquid boiling at 86°–100° C at 0.25mm. Yield 92%.

Anal. Calc'd for $C_{12}H_{16}O_4$: C, 64.2; H, 7.2. Found: C, 64.3; H, 7.5.

Preparation 2–4

Additional endo- and exo-5-alkoxycarbonyl-substituted-5-carbomethoxy-2-norbornenes were prepared by the procedures of Preparation 1 except using, in place of the ethyl chloroformate, an equivalent amount (1.0 mole) of either methyl chloroformate, allyl chloroformate or butyl chloroformate. The compounds identified in Table I were obtained.

TABLE I

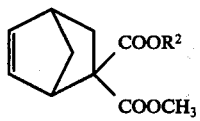

| Prep-aration No. | Chloro-formate Used | $R^2$ | bp (° C) | Yield (%) |
| --- | --- | --- | --- | --- |
| 2 | Methyl chloro-formate | —$CH_3$ | 85–91/1.5mm | 85 |
| 3 | Allyl chloro-formate | $CH_2=CH-CH_2-$ | 95–105/0.4mm | 90 |
| 4 | n-Butyl chloro-formate | n-$C_4H_9$ | 120/1mm | 90 |

Preparation 5

Endo- and Exo-5,5-di (carboethoxy)-2-norbornene

This compound was prepared by the procedures of Preparation 1 except using an equivalent amount (0.5 mole) of endo- and exo-5-carboethoxy-2-norbornene in place of the endo- and exo-5-carbomethoxy-2-norbornene. The product distilled at 95°–105° C/1.5mm. Yield: 90%.

EXAMPLE 1

Methyl ethyl methylenemalonate

The norbornene of preparation I (100 g, 0.45 mole) was added over 2 hours at the top of a vertical quartz tube (1 ft. × 1 in.) packed with quartz chips kept at 650° C. The crude product was collected under reduced pressure (2–4 mm) in a receiver cooled at −20° C (carbon tetrachloride/Dry Ice). The material was distilled giving methyl ethyl methylenemalonate, b.p. 45° C/0.5mm and endo- and exo-5-carboethoxy-5-carbomethoxy-2-norbornene, b.p. 86°–100° C/0.25mm. The yield based on recovered starting material was 75%.

EXAMPLES 2 – 5

Additional compounds of the invention were prepared by the procedure of Example 1 except using the norbornene from one of the preparations 2 through 5. The products obtained are described in the following Table II.

TABLE II

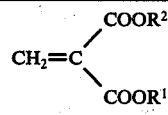

| Example | Starting Norbornene Preparation Number | $R^1$ | $R^2$ | b.p. (° C) |
| --- | --- | --- | --- | --- |
| 2 | 2 | —$CH_3$ | $CH_3$ | 60/2mm |
| 3 | 3 | —$CH_3$ | $CH_2-CH=CH_2$ | 58/0.25mm |
| 4 | 4 | —$CH_3$ | $C_4H_9$ | 60/0.50mm |
| 5 | 5 | —$C_2H_5$ | $C_2H_5$ | 70/0.75mm |

EXAMPLE 6

Demonstration of Adhesive Properties of Methylethyl methylenemalonate

The adhesive prepared by the method of Example 1 was tested for adhesive properties. The following are the results.

Glass-Glass

One drop of methyl ethyl methylenemalonate was placed between 2 glass plates and the 2 glass plates were contacted with no pressure or heat applied. The surfaces were bonded instantaneously.

Glass-Metal

A drop of the adhesive of Example 1 was placed between a glass plate and a metal spatula. A bond resulted.

The above glass-glass and glass-metal composites were placed in a hot water bath at 80° C. The glass plates adhered with adhesive prepared by the method of Example 1 could not be pulled apart for 20 hours. The glass plate and spatula, adhered with the compound of Example 1, were pulled apart only after 20 hours in the 80° C water bath.

EXAMPLE 7

Demonstration of Adhesive Properties of Methylallyl methylenemalonate

Hot rolled steel to steel bonds having one-half square inch areas were prepared from methyl allyl methylenemalonate (MAMM). These bonds were mounted in an XWR Weather-Ometer and subjected to accelerated weathering conditions. The average lap shear strengths of the bonds removed from the XWR Weather-Ometer after being subjected to accelerated weathering for the time indicated are shown below.

TABLE III

| Time (hrs.) | MAMM (psi) |
| --- | --- |
| 0 | 800 |
| 100 | 1138 |
| 200 | 1680 |
| 400 | 1912 |
| 800 | 2112 |
| 1600 | 2018 |

Under these conditions, which are described in ASTM Procedure Designation G23-69, it is expected that approximately 400 hours are equivalent to 1 year of outdoor exposure.

Lap shear strength was tested using the procedure described in ASTM Designation D1002.

Although the invention has been described in detail with particular reference to certain preferred embodiments thereof, variations and modifications can be effected within the spirit of the invention as described hereinabove.

What is claimed is:

1. A process for preparing methylenemalonates having the formula

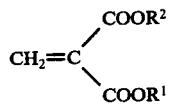

wherein $R^2$ is selected from the group consisting of alkyl or $R^1$; $R^1$ is selected from the group consisting of alkyl, allyl $R^5$—$O(CH_2)_n$, glycidyl, haloalkyl, vinyl, propargyl, and cycloalkyl; $R^5$ is alkyl and $n$ is an integer of from 1 to 10, comprising (1) reacting a compound having the formula

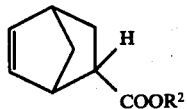

wherein $R^2$ is as described above with an electrophilic material having the formula $XCOOR^1$ wherein $R^1$ is as described above and X is halogen in the presence of an alkyl-substituted lithium amide complex at a temperature range of $-78°$ C to $-40°$ C and (2) pyrolyzing the resulting norbornene at a temperature of 400° C to 800° C at 1mm to 760mm Hg pressure in an inert atmosphere.

2. The process of claim 1 wherein the reaction product of step (1) is isolated prior to pyrolysis step (2).

3. The process of claim 1 wherein the methylenemalonate resulting from the pyrolysis is purified by distillation.

4. The process of claim 1 wherein the alkyl substituted lithium amide is lithium alkylcyclohexylamide wherein the alkyl portion contains from 1 to 12 carbon atoms.

5. A process of preparing a compound having the formula

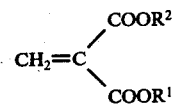

wherein $R^2$ is alkyl or $R^1$; $R^1$ is selected from the group consisting of alkyl, allyl, $R^5O$ $(CH_2)_n$, glycidyl, haloalkyl, vinyl, propargyl, and cycloalkyl; $R^5$ is alkyl and $n$ is an integer from 1 to 10 comprising (1) reacting the compound having the formula

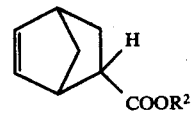

wherein $R^2$ is as defined above with a compound having the formula $XCOOR^1$ wherein $R^1$ is as defined above and X is halide in the presence of lithium N-isopropylcyclohexylamide at at temperature of $-78°$ C to $-40°$ C and (2) pyrolyzing the resultant product at a temperature of 400° C to 800° C at 1mm to 760mm Hg pressure in an inert atmosphere.

6. The process of claim 5 wherein the reaction product of step (1) is isolated prior to pyrolysis step (2).

7. The process of claim 5 wherein the product of step (2) is purified by distillation.

* * * * *